April 2, 1957  E. BERGLES  2,787,173

CHANGE-SPEED GEARING, PARTICULARLY FOR BICYCLES OR THE LIKE

Filed March 2, 1953

Inventor
Edward Bergles
By Charles L. Lovercheck
Attorney

United States Patent Office 2,787,173
Patented Apr. 2, 1957

2,787,173

CHANGE-SPEED GEARING, PARTICULARLY FOR BICYCLES OR THE LIKE

Eduard Bergles, Graz, Liebenau, Austria, assignor to Karl J. Kollmann, Erie, Pa.

Application March 2, 1953, Serial No. 340,091

Claims priority, application Austria April 30, 1952

3 Claims. (Cl. 74—750)

This invention relates to transmissions for increase or decrease in the speed ratio between a drive and a driven member, especially adapted for use in a bicycle or similar vehicle. Priority of filing date of this application is claimed under 25 U. S. C. 119. The priority date claimed is that of April 30, 1952, the filing date of Austrian patent application, Serial No. A 2590/52.

In bicycles, it has long been a problem to provide a satisfactory means for increasing or decreasing the speed ratio between the drive and driven member in order to provide increased power for pulling up grades and over uneven surfaces and, at the same time, to have available an increased speed ratio whereby an increase in the speed of the vehicle can be obtained for operation on smooth level surfaces. Planetary gear drives have been found most suitable for use in bicycles because of the limited space available which is required for accommodating a planetary transmission and because of the special adaptability of a planetary drive for use on a bicycle. However, up until the present time, the planetary transmissions which have been adapted for use on bicycles have been extremely complicated and considerable difficulty has been encountered in repairing the transmissions and in replacing worn parts therein. Most of the planetary transmissions now in use on bicycles are of such a complicated nature that the ordinary bicycle mechanic is reluctant to repair them and if an inexperienced person assembles the transmission, it is necessary to have an expert mechanic employed to reassemble and service the transmission. Obviously, such an intricate equipment is unsatisfactory for use by children who are inclined to take apart things which are in perfect operating condition.

In planetary type transmissions, frequently the internal gear of the shiftable unit is centered relative to the gear shift only by interaction of the internal toothing of the internal gear with the teeth of the planetary gears. This has a disadvantage in the case of considerable backlash between the teeth on the internal gear and the planetary gears; the internal gear may be displaced to such a degree that shifting will be very difficult.

It is, accordingly, an object of this invention to overcome the above and other defects in previous transmissions by providing a transmission which will be simple in construction and economical to manufacture.

Another object of the invention is to provide a bicycle transmission wherein the parts are assembled in units and wherein the disassembly and assembly of the transmission for repair and replacement of parts is very simple and does not require the skill of an expert or trained mechanic.

Another object of the invention is to provide a novel type of control means for a bicycle transmission wherein the speed changing is of a particular design which facilitates shifting from one speed to another.

Another object of the invention is to provide a novel type of housing and associated mechanism therewith for a planetary transmission.

Another object of the invention is to provide a bicycle transmission which can be used in connection with a conventional type of bicycle wheel without additional space required for the transmission.

Another object of the invention is to provide a novel type of planetary gear supporting assembly within a planetary transmission.

Another object of the invention is to provide a novel type of shifting arrangement in a planetary transmission.

A further object of the invention is to provide a transmission which can be applied to a bicycle wheel of conventional size and shape.

Another object of the invention is to provide a novel means of supporting the ring gear in a planetary transmission.

With the above and other objects in view, the present invention consists of the combination and arrangement of parts hereinafter more fully described, illustrated in the accompanying drawing, and more particularly pointed out in the appended claims, it being understood that changes may be made in the form, size, proportions, and minor details of construction without departing from the spirit or sacrificing any of the advantages of the invention.

Figure 3:
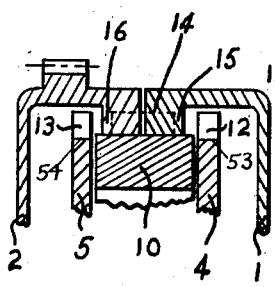
Figure 4:
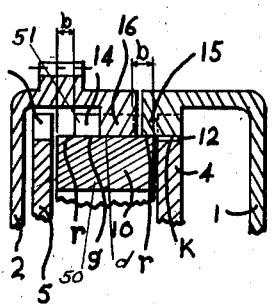
Figure 5:
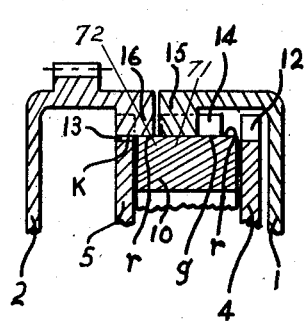

Figs. 3, 4, and 5 show the planetary carrier of the transmission with the gears shifted to give a low speed in Fig. 4, a direct drive in Fig. 3, and an overdrive in Fig. 5.

Figure 1:
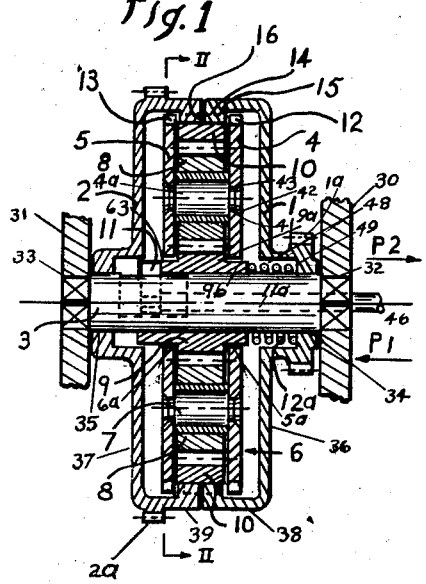
Fig. 1 shows a cross sectional view taken on line 1—1 of Fig. 2.
Figure 2:
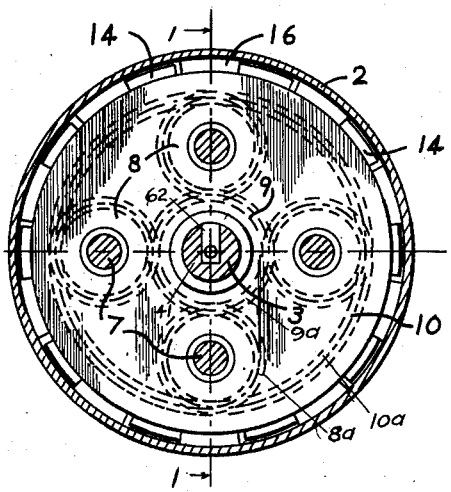
Fig. 2 shows a cross sectional view taken on line 2—2 of Fig. 1.

Now with more specific reference to the drawing, Fig. 1 shows my novel transmission assembled on the hub of a bicycle. The transmission consists of the driving housing 1 and the driven housing 2. The drive housing 1 has the sprocket teeth 1a formed thereon to accommodate the chain of a bicycle and the driven housing 2 is adapted to be attached to the inside of a hub of a bicycle wheel at 2a. Both the drive housing 1 and the driven housing 2 are rotatably mounted on the stationary shaft 3 which is fixed to the frames 30 and 31 of the bicycle at 32 and 33, respectively. The drive housing 1 has a bearing surface 34 which engages the fixed shaft 3 and the driven housing 2 has a bearing surface 35 which engages the shaft 3. Both the drive and driven housings are concave in shape and they have the radial extending side members 36 and 37, respectively, and the peripheral surfaces 38 and 39, respectively. The radial extending members and the peripheral extending members define a cavity which houses the planetary assembly. The planetary assembly is made up of the side members or planetary gear carrier plates 4 and 5 and the planetary pinions 8 are rotatably mounted between the side plates 4 and 5 on pins or hubs 7. The hubs 7 have enlarged bearing portions 40 and reduced side portions 41 which extend through holes 42 in the side plates and are held against removal by the peened surfaces 43.

The planetary gears or pinions 8 have teeth 8a thereon which engage teeth 9a on the sun gear 9 and engage the teeth 10a on the ring gear 10.

The planetary gear carriers 6 having the plate members 4 and 5 are freely rotatably mounted on the hub 9b of the sun gear 9. The plates 4 and 5 have the holes 5a and 6a, respectively, having surfaces which engage the hub 9b. A keyway 62 is provided in the shaft 3 and a key 11a has an upwardly extending portion 11 which engages the sun gear at 63 to urge it on the shaft 3. The shifting rod 46 is attached to the key 11a and may be attached to a suitable shifting lever or linkage when it is desired. The sun gear 9 and the key 11a are urged towards the left by the spring 12a which is housed in the counterbore 48 and bears against the surface 49 thereof and against the hub 9b of the sun gear to urge the sun gear to the left.

Claws or notches 12 are formed on the plate 4 and similar claws or spaced notches 13 are formed on the periphery of the plate 5. Similarly spaced claws or notches 14 are provided on the ring gear 10. Spaced notches or claws 15 are formed on the inside of the peripherally extending members 38 of the driving member 1 and similar claws 16 are formed on the inner surface of the peripheral member 39 of the driven member 2. The notches 12, 13, 14, 15, and 16 cooperate with each other to produce the speed increase or reduction in a manner which will be later described.

It will be noted from an examination of Figs. 3, 4, and 5 that, dependent on the lateral shifted position of the planetary assembly 6, the notches 15 on the drive housing and the notches 16 on the driven housing engage the notches 14 on the ring gear 10 to hold the drive housing 1 and the driven housing 2 against relative rotation, thereby giving a direct drive. In order to obtain a speed increase, the planetary assembly 6 is moved to the left by the force of the spring 12a when the force on the shifting mechanism 46 is released to move the planetary assembly to the position shown in Fig. 4. In that position, it will be noted that the notches 15 on the drive housing 1 engage the notches 12 on the plate 4 to rotate therewith and the notches 16 on the driven housing 2 engage the notches 14 on the ring gear 10 of the planetary assembly 6 to rotate therewith. It will be apparent to persons familiar with the operation of planetary transmissions that the transmission will give a speed increase between the drive housing 1 and the driven housing 2.

If the shifting rod 46 is forced to the right, thereby exerting a force between the key 11a and the planetary assembly 6, the planetary assembly will be moved against the force of the spring 12a to the position shown in Fig. 5. In that position, the drive housing 1 through the notches 15 thereon will engage the ring gear 10 through the notches 14 and rotate therewith. The driven housing 2 through the notches 16 will engage the plate 5 through the notches 13 and will rotate therewith, thereby giving a stepdown ratio between the drive housing 1 and the driven housing 2 since there will be a relative rotation between the drive housing 1 and the driven housing 2.

As is shown in Figs. 3, 4, and 5, the notches or claws 14 on the ring gear 10 do not extend out completely to the edge thereof. A clearance b of a distance is provided between the edges 50 of the planetary gear and the edge 51 of the notch 14. The surface r is machined down to a diameter equal to the root diameter of the notches 14 at g. The cylindrical surface r is provided so that inside surfaces 71 of the notch 15 and the inside surface 72 of the notch 16 engage a surface of the ring gear at all times and hold it centered in the drive and driven housings. The ring gear is laterally supported by the plates 4 and 5. The surfaces r are machined cylindrically so that when there is relative rotation between the ring gear and the notches, thereby providing shoulders, a smooth rotating surface is presented between the two members. Crowned surfaces K on the drive housing and surfaces d on the driven housing engage the cylindrical surfaces r of the ring gear with a sliding fit, thereby centering the ring gear in all positions of operation and shifting.

By virtue of the fact that the offset b is provided in the notches 14 of the edges 50 from the ring gear, a much closer spacing of the notches 15 and 16 can be utilized whereby it is possible to utilize a much greater width of the notches 15 and 16, even though the desired design of the unit requires a very small lateral movement of the planetary assembly 6 to accomplish the shifting desired. It also makes it possible to maintain the ring gear cylindrical surface r in contact with the notches at all points of displacement, thereby eliminating any disturbance of engagement of the circles of notches 15 and 16. An interference of the engagement of the circle of notches 15 and 16 with the notches 12 and 13 of the side members 4 and 5 of the planetary assembly 6 is also avoided by making the root surfaces 53 and 54 of the notches 14 and 15 of slightly lesser diameter than the diameter of the cylindrical surface r of the ring gear.

The manner in which the speed ratio increase or decrease of the transmission is obtained is as follows: If we consider the radius of the ring gear as R and the radius of the sun gear as S, for one revolution of the planetary assembly, the ring gear will rotate an amount equal to $$\frac{R \text{ plus } S}{R} \text{ or } 1 \text{ plus } \frac{S}{R}$$

In other words, if the diameter of the sun gear is equal to half the diameter of the ring gear, the overdrive would be one and one-half times the direct drive and the underdrive would be two-thirds of the direct drive.

In the foregoing specification, I have set forth the invention in its preferred practical forms but I am aware that the structure shown is capable of modification within a range of equivalents without departing from the invention which is to be understood is broadly novel as is commensurate with the appended claims.

What I claim is:

1. A planetary transmission for bicycles or the like comprising a fixed shaft, a gearing unit slidably mounted on said shaft, said gearing unit comprising a sun gear, a ring gear, and a planetary gear, said ring gear being disposed between two plates and radially floatingly supported by its meshing engagement with said planetary gear, said planetary gear being carried by said plates, spaced radially extending lugs on the outer periphery of said ring gear set inward from one edge thereof whereby a peripheral shoulder is provided extending outward from said lugs, a driving and a driven member having a portion thereof overlying said ring gear, and inwardly extending claws on said driving and said driven members, said claws being wider than the thickness of said plates, a portion of said claws rotatably and slidably engaging said shoulder when said claws are in engagement with said plates to provide mutual support between said ring gear and said cup shaped member whereby said claws slide over said shoulder and are guided into engagement with said notches when said claws are moved into engagement with said lugs on said ring gear to provide mutual support between said other cup shaped member and said ring gear.

2. The planetary transmission recited in claim 1 wherein said notches are spaced inwardly from both edges of said ring gear and said claws on said driving member engage one said shoulder and said driven member claws engage the other said shoulder.

3. A planetary transmission comprising a fixed shaft, a gearing unit slidably mounted on said shaft, said gearing unit comprising a sun gear, a ring gear, and planetary gears, said ring gear being disposed between two plates and radially floatingly supported by its meshing engagement with said planetary gears, said planetary gears being supported on axles extending through said plates, said sun gear being slidably and non-rotatably supported on said fixed shaft, a cup shaped driving member and a cup shaped driven member concentrically disposed on said shaft and rotatable thereabout and opening toward each other with the peripheral edges of said open ends being disposed in juxtaposition to each other, said cup shaped members having spaced claws disposed around the inner periphery adjacent said peripheral edges thereof, and spaced notches disposed on the outer periphery of said plates, said ring gear having an outer cylindrical surface with spaced lugs disposed inwardly from the edges thereof, said ring gear cylindrical surface being more than twice as wide as either of said cup shaped member claws, said cup shaped member claws being wider than the thickness of said plates, said cup shaped member claws on one said member rotatably and slidably engaging said cylindrical surface and said lugs to provide mutual support between said ring gear and said cup shaped member while said claws on said other cup shaped member are in engagement with said notches on one said plate and with said ring gear cylindrical surface to provide mutual support between said other cup shaped member and said ring gear.

References Cited in the file of this patent

UNITED STATES PATENTS

| | | |
|---|---|---|
| 1,696,179 | Ahlm | Dec. 25, 1928 |
| 1,810,494 | Murray | June 16, 1931 |

FOREIGN PATENTS

| | | |
|---|---|---|
| 12,231 1906 | Great Britain | May 23, 1907 |
| 18,035 1911 | Great Britain | Aug. 9, 1912 |
| 503,837 | Belgium | June 30, 1951 |